United States Patent
Lee et al.

(10) Patent No.: US 9,699,771 B2
(45) Date of Patent: *Jul. 4, 2017

(54) METHOD FOR ENABLING TERMINAL TO TRANSMIT ACK/NACK RESPONSE IN WIRELESS COMMUNICATION SYSTEM AND APPARATUS THEREFOR

(75) Inventors: Seungmin Lee, Anyang-si (KR); Hanbyul Seo, Anyang-si (KR); Hakseong Kim, Anyang-si (KR); Daewon Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 271 days.

This patent is subject to a terminal disclaimer.

(21) Appl. No.: 14/112,863

(22) PCT Filed: May 3, 2012

(86) PCT No.: PCT/KR2012/003474
§ 371 (c)(1),
(2), (4) Date: Oct. 18, 2013

(87) PCT Pub. No.: WO2012/150827
PCT Pub. Date: Nov. 8, 2012

(65) Prior Publication Data
US 2014/0044084 A1    Feb. 13, 2014

Related U.S. Application Data

(60) Provisional application No. 61/482,208, filed on May 4, 2011.

(51) Int. Cl.
*H04W 72/04* (2009.01)
*H04L 1/18* (2006.01)

(52) U.S. Cl.
CPC ......... *H04W 72/042* (2013.01); *H04L 1/1861* (2013.01)

(58) Field of Classification Search
CPC ... H04L 1/1861; H04L 5/0048; H04L 5/0023; H04L 5/0094; H04L 5/0053;
(Continued)

(56) References Cited

U.S. PATENT DOCUMENTS 8,982,806 B2 * 3/2015 Parkvall ............... H04L 5/0053
370/329
9,031,028 B2 * 5/2015 Kim .................... H04W 72/042
370/329
(Continued)

FOREIGN PATENT DOCUMENTS

KR    WO 2010128790 A2 * 11/2010 ........... H04L 5/0032

OTHER PUBLICATIONS

"Summary of relay email discussion [59-12-LTE-A]: Others," 3GPP TSG RAN WG1 meeting #59bis R1-100381, Valencia, Spain, Jan. 18-22, 2010, 8 pages.
(Continued)

*Primary Examiner* — Dung B Huynh
(74) *Attorney, Agent, or Firm* — Birch, Stewart, Kolasch & Birch, LLP

(57) ABSTRACT

The present application relates to a method for enabling a terminal to transmit an uplink ACK/NACK (Acknowledgement/negative ACK) response to a base station in a time-division multiplexing wireless communication system. Specifically, the method includes the steps of: receiving a setting for an uplink-downlink subframe from the base station; receiving downlink control information and downlink data information scheduled through the downlink control information, from the base station based on the setting for the uplink-downlink subframe; and transmitting an ACK/NACK response for the downlink data information to the base station, wherein the subframe to which the ACK/NACK response is transmitted is determined according to
(Continued)

whether an ending symbol of the downlink control information is after a particular symbol of the sub-frame for receiving the downlink control information.

8 Claims, 8 Drawing Sheets

(58) Field of Classification Search
CPC .. H04L 5/0055; H04L 1/1887; H04W 72/042; H04W 72/0406; H04W 72/04; H04W 72/0413; H04W 72/1289; H04W 72/12; H04W 72/1278; H04B 7/155; H04B 7/2606
See application file for complete search history.

(56) References Cited

U.S. PATENT DOCUMENTS

| | | | | |
|---|---|---|---|---|
| 2010/0165847 A1* | 7/2010 | Kamuf | ............... | H04L 5/0007 370/241 |
| 2010/0281323 A1* | 11/2010 | Wang | ............... | H04B 7/15507 714/748 |
| 2010/0316096 A1* | 12/2010 | Adjakple | ............ | H04L 1/1887 375/211 |
| 2011/0038303 A1* | 2/2011 | Ji | ............... | H04W 74/002 370/315 |
| 2011/0038327 A1* | 2/2011 | Moon | ............... | H04L 1/004 370/329 |
| 2011/0044391 A1* | 2/2011 | Ji | ............... | H04L 5/0007 375/260 |
| 2011/0051654 A1* | 3/2011 | Blankenship | ........ | H04B 7/2606 370/315 |
| 2011/0069637 A1* | 3/2011 | Liu | ............... | H04L 5/0007 370/254 |
| 2011/0103292 A1* | 5/2011 | Pasad | ............... | H04B 7/155 370/315 |
| 2011/0170496 A1* | 7/2011 | Fong | ............... | H04L 5/0053 370/329 |
| 2011/0211551 A1* | 9/2011 | Parkvall | ............... | H04L 5/0053 370/330 |
| 2011/0249633 A1* | 10/2011 | Hong | ............... | H04L 5/0053 370/329 |
| 2011/0268062 A1* | 11/2011 | Ji | ............... | H04L 5/0055 370/329 |
| 2011/0268064 A1* | 11/2011 | Chen | ............... | H04L 5/003 370/329 |
| 2011/0269442 A1* | 11/2011 | Han | ............... | H04W 72/082 455/418 |
| 2011/0317610 A1* | 12/2011 | Park | ............... | H04B 7/155 370/312 |
| 2012/0057523 A1* | 3/2012 | Ji | ............... | H04L 5/0032 370/315 |
| 2012/0076043 A1* | 3/2012 | Nishio | ............... | H04L 1/1893 370/252 |
| 2012/0113884 A1* | 5/2012 | Park | ............... | H04L 1/0003 370/312 |
| 2012/0182931 A1* | 7/2012 | Shen | ............... | H04B 7/155 370/315 |
| 2012/0213163 A1* | 8/2012 | Lee | ............... | H04L 1/1861 370/329 |
| 2012/0263097 A1* | 10/2012 | Bi | ............... | H04W 72/04 370/315 |
| 2012/0275400 A1* | 11/2012 | Chen | ............... | H04J 11/0033 370/329 |
| 2012/0294225 A1* | 11/2012 | Awad | ............... | H04B 7/15528 370/315 |
| 2012/0327842 A1* | 12/2012 | Shen | ............... | H04L 5/0053 370/315 |
| 2013/0039284 A1* | 2/2013 | Marinier | ............... | H04L 5/001 370/329 |
| 2013/0230015 A1* | 9/2013 | Hoymann | ............... | H04L 5/0053 370/329 |
| 2013/0265934 A1* | 10/2013 | Zeng | ............... | H04L 5/0023 370/315 |
| 2013/0329711 A1* | 12/2013 | Seo | ............... | H04J 11/0069 370/336 |
| 2014/0086188 A1* | 3/2014 | Hoymann | ............... | H04L 5/0053 370/329 |
| 2014/0241298 A1* | 8/2014 | Park | ............... | H04L 5/001 370/329 |

OTHER PUBLICATIONS

Motorola, "Remaining Details on ACK/NACK Bundling for TDD," 3GPP TSG RAN1#53-Bis, R1-082473, Warsaw, Poland, Jun. 29-Jul. 4, 2008, 3 pages.

* cited by examiner

FIG. 2
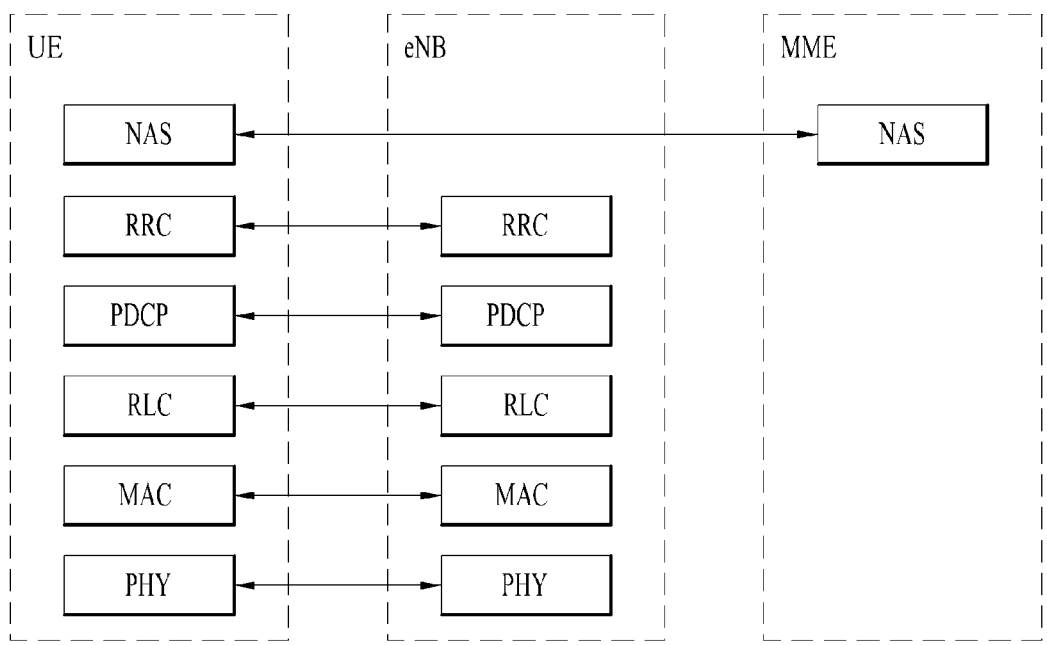
(a) CONTROL-PLANE PROTOCOL STACK
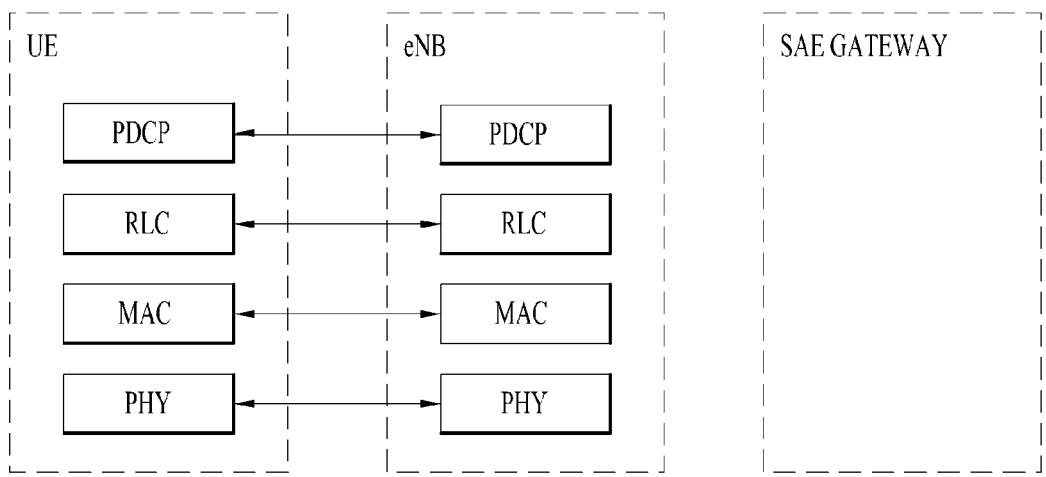
(b) USER-PLANE PROTOCOL STACK МЕТHOD FOR ENABLING TERMINAL TO TRANSMIT ACK/NACK RESPONSE IN WIRELESS COMMUNICATION SYSTEM AND APPARATUS THEREFOR

CROSS REFERENCE TO RELATED APPLICATIONS

This application is the National Phase of PCT/KR2012/003474 filed on May 3, 2012, which claims priority under 35 U.S.C. 119(e) to U.S. Provisional Application No. 61/482,208 filed on May 4, 2011, all of which are hereby expressly incorporated by reference into the present application.

TECHNICAL FIELD

The present invention relates to a wireless communication system, and more particularly, to a method of transmitting an ACK/NACK (Acknowledgement/negative ACK) response, which is transmitted by a user equipment in a wireless communication system and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of transmitting an ACK/NACK (Acknowledgement/negative ACK) response, which is transmitted by a user equipment in a wireless communication system and an apparatus therefor in the following description based on the discussion as mentioned in the foregoing description.

Technical Solution

To achieve these and other advantages and in accordance with the purpose of the present invention, as embodied and broadly described, according to one embodiment, a method of transmitting an uplink ACK/NACK (Acknowledgement/Negative ACK) response, which is transmitted to an eNode B by a user equipment in a frequency division multiplexing wireless communication system includes the steps of receiving a downlink control information and a downlink data information scheduled by the downlink control information from the eNode B in a subframe # n and transmitting an ACK/NACK response for the downlink data information to the eNode B, wherein a subframe to which the ACK/NACK response is transmitted is determined according to whether an end symbol of the downlink control information is a symbol situated after a specific symbol of the subframe # n.

Preferably, if the end symbol of the downlink control information corresponds to the specific symbol of the subframe # n or a symbol situated previous of the specific symbol, the subframe to which the ACK/NACK response is transmitted corresponds to a subframe # n+4.

More preferably, the downlink control information is received via a data region of the subframe # n and the specific symbol of the subframe # n correspond to a symbol where a first slot of the subframe # n ends.

Meanwhile, to further achieve these and other advantages and in accordance with the purpose of the present invention, according to a different embodiment, a method of transmitting an uplink ACK/NACK (Acknowledgement/Negative ACK) response, which is transmitted to an eNode B by a user equipment in a time division multiplexing wireless communication system includes the steps of receiving an uplink-downlink subframe configuration from the eNode B, receiving a downlink control information and a downlink data information scheduled by the downlink control information from the eNode B based on the uplink-downlink subframe configuration, and transmitting an ACK/NACK response for the downlink data information to the eNode B, wherein a subframe to which the ACK/NACK response is transmitted is determined according to whether an end symbol of the downlink control information is a symbol situated after a specific symbol of the subframe, which has received the downlink control information.

Specifically, if the end symbol of the downlink control information corresponds to the specific symbol of the subframe, which has received the downlink control information, or a symbol situated previous of the specific symbol, the subframe to which the ACK/NACK response is transmitted corresponds to a subframe # m defined by the uplink-downlink subframe configuration. And, if the end symbol of the downlink control information corresponds to a symbol situated after the specific symbol of the subframe, which has received the downlink control information, the subframe to which the ACK/NACK response is transmitted corresponds to a nearest uplink subframe appearing after a predefined subframe # m defined by the uplink-downlink subframe configuration.

Meanwhile, according to a different embodiment of the present invention, if the downlink data information is received in a subframe # n−K and the ACK/NACK response for the downlink data information is transmitted in a subframe # n, the K is defined by a Table A in the following.

TABLE A

| UL-DL subframe Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 7 | — | — | — | — | 6, 7 | — | — |
| 1 | — | — | 7, 6, 8 | — | — | — | — | 7, 6, 8 | — | — |
| 2 | — | — | 8, 7, 6, 9 | — | — | — | — | 8, 7, 6, 9 | — | — |
| 3 | — | — | 7, 6, 11, 12 | 6, 5 | 5 | — | — | — | — | — |
| 4 | — | — | 12, 8, 7, 11, 13 | 6, 5, 7 | — | — | — | — | — | — |
| 5 | — | — | 13, 12, 9, 8, 7, 5, 11, 6, 14 | — | — | — | — | — | — | — |
| 6 | — | — | 7 | 7 | 5 | — | — | 7 | 7 | — |

Moreover, according to a different embodiment of the present invention, it the downlink data information is received in a subframe # n−K and the ACK/NACK response for the downlink data information is transmitted in a subframe # n, the K is defined by a Table B in the following.

TABLE B

| UL-DL subframe Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 9 | — | — | 6 | — | 9 |
| 1 | — | — | 7, 6 | 9 | — | — | — | 7, 6 | 9 | — |
| 2 | — | — | 8, 7, 6, 9 | — | — | — | — | 8, 7, 6, 9 | — | — |
| 3 | — | — | 7, 6, 11 | 6, 5 | 5, 14 | — | — | — | — | — |
| 4 | — | — | 12, 8, 7, 11 | 6, 5, 7, 14 | — | — | — | — | — | — |
| 5 | — | — | 13, 12, 9, 8, 7, 5, 11, 6, 14 | — | — | — | — | — | — | — |
| 6 | — | — | 7 | 7 | 5 | — | — | 7 | 7 | — |

Advantageous Effects

According to embodiments of the present invention, a user equipment can efficiently transmit an ACK/NACK (Acknowledgement/negative ACK) response to an eNode B in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram for structures of control and user planes of radio interface protocol between a 3GPP radio access network standard-based user equipment and E-UTRAN;

BEST MODE

Mode for Invention

Figure 1:
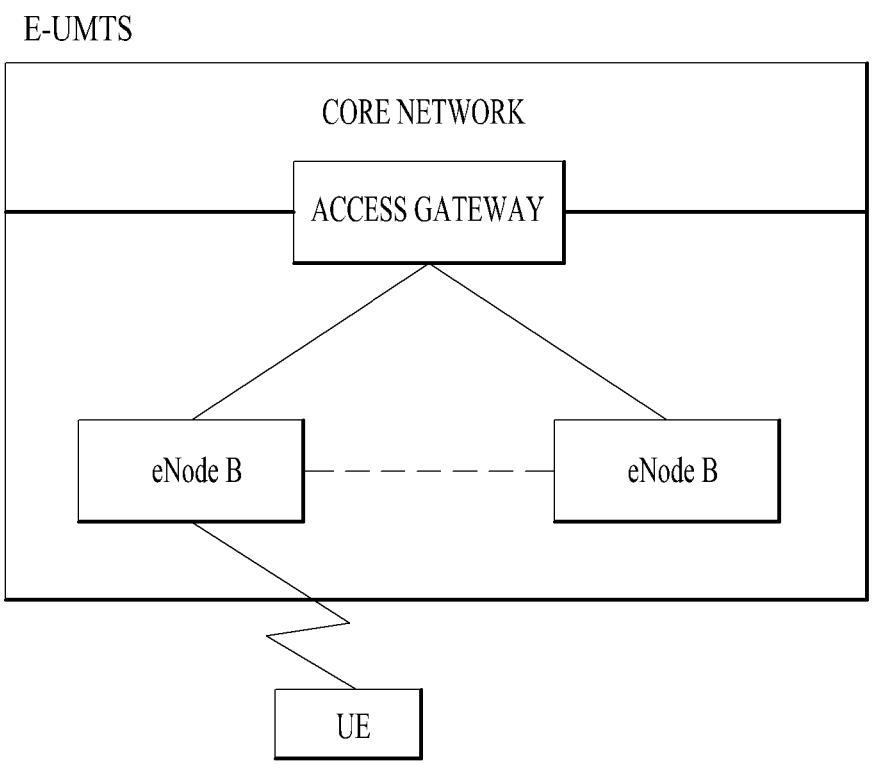
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
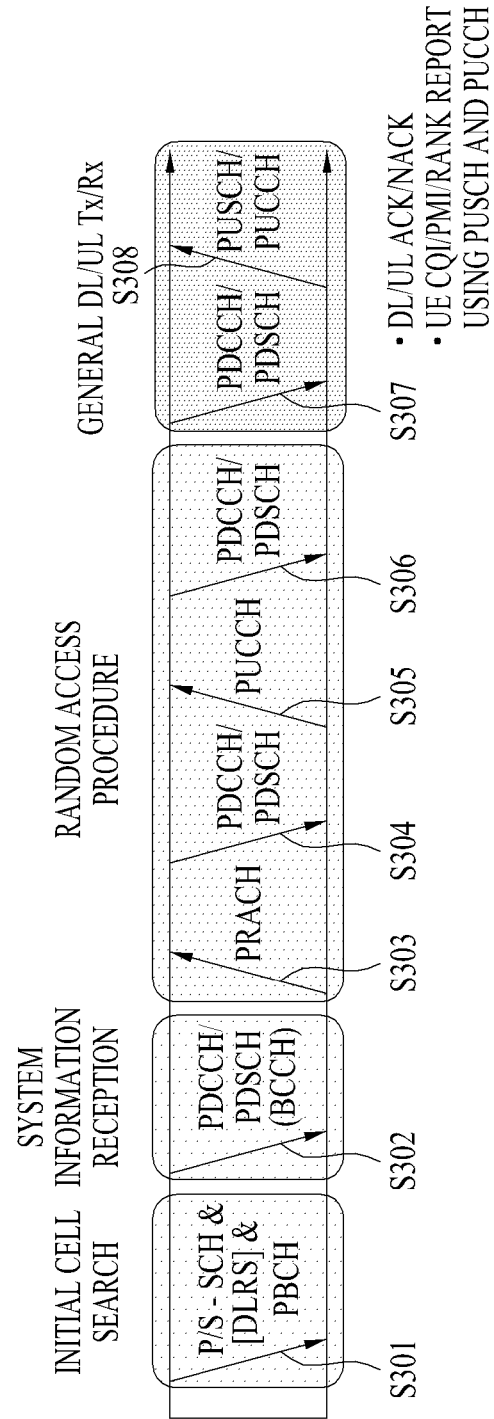
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may be then able to obtain information such as a cell ID and the like. Subsequently, the user equipment receives a physical broadcast channel from the eNode B and may be then able to obtain intra-cell broadcast information. Meanwhile, the user equipment receives a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure (RACH) to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
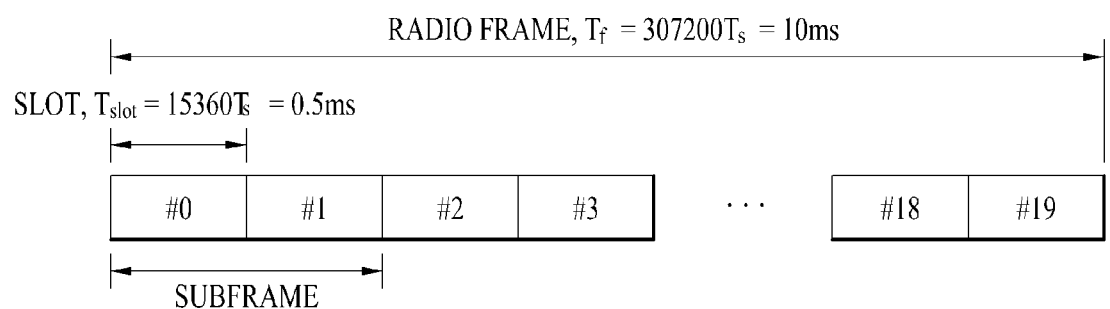
FIG. 4 is a diagram for a structure of a radio frame in LTE system.

FIG. 4 is a diagram for a structure of a radio frame used in an LTE system.

Referring to FIG. 4, one radio frame has a length of 10 ms ($327{,}200 \times T_S$) and is constructed with 10 subframes in equal size. Each of the subframes has a length of 1 ms and is constructed with two slots. Each of the slots has a length of 0.5 ms ($15{,}360 \times T_S$). In this case, $T_S$ indicates a sampling time and is represented as $T_X=1/(15\text{ kHz}\times 2048)=3.2552\times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
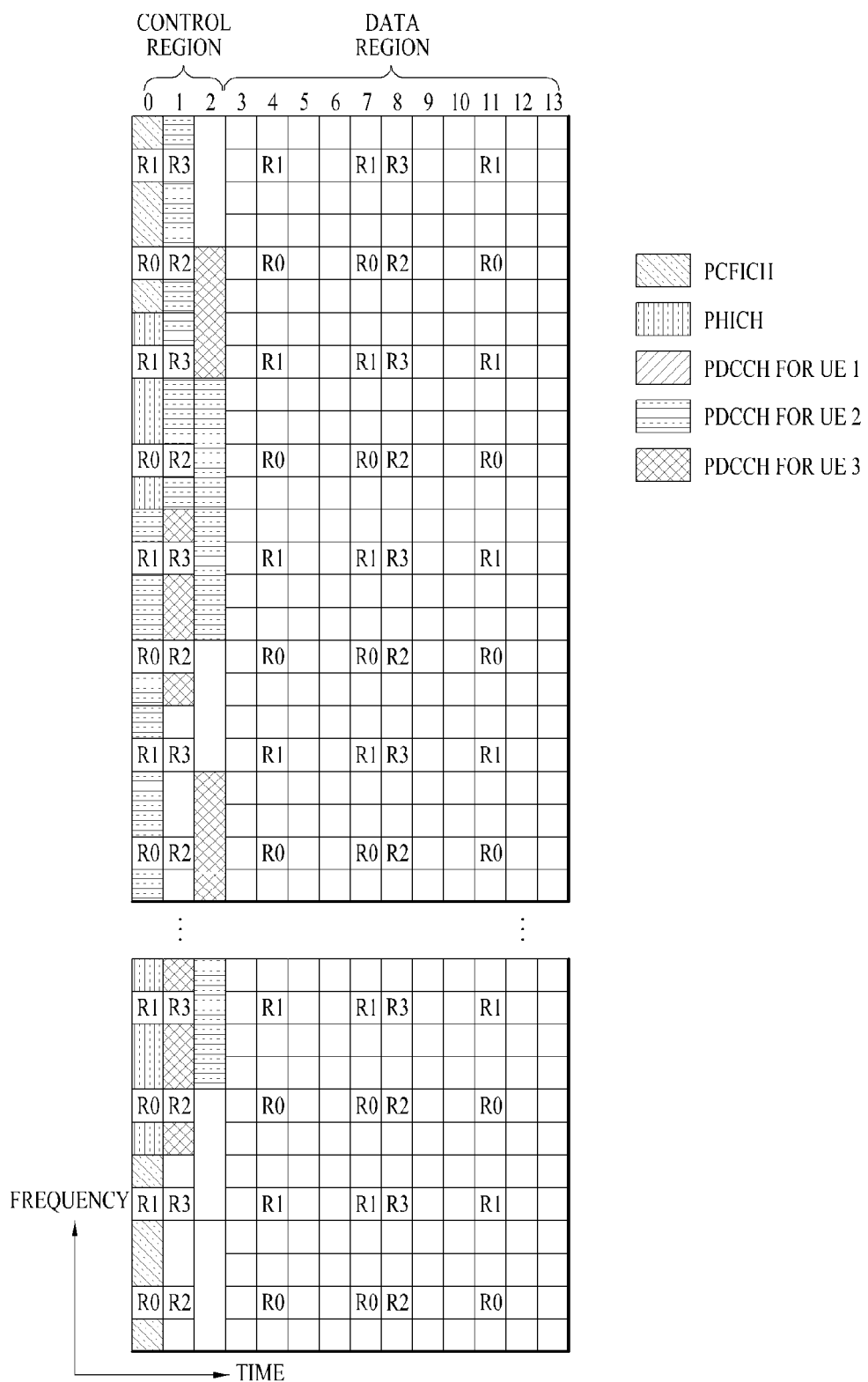
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS or a pilot signal) for an antenna 0 to 3. The RS is fixed as a constant pattern in the subframe irrespective of the control region and the data region. The control channel is allocated to a resource to which the RS is not allocated in the control region and a traffic channel is also allocated to a resource to which the RS is not allocated in the data region. The control channel allocated to the control region may include a physical control format indicator channel (PCFICH), a physical hybrid-ARQ indicator channel (PHICH), a physical downlink control channel (PDCCH) and the like.

The PCFICH is a physical control format indicator channel and informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH is a physical HARQ (hybrid-automatic repeat and request) indicator channel and used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH is a physical DL control channel and is allocated to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on where the data of the PDSCH is transmitted to which user equipment (one or a plurality of user equipments) and the information on how to receive and decode the PDSCH data by the user equipments and the like are transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transmission block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
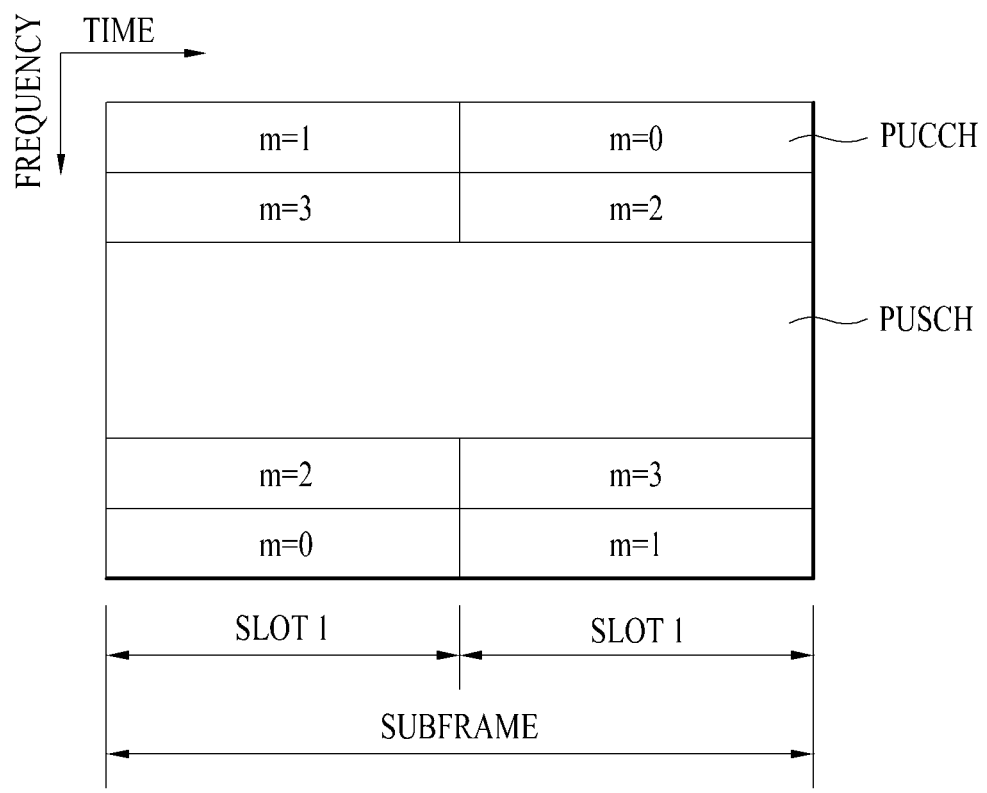
FIG. 6 is a diagram for a structure of an uplink subframe used in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource request, and the like. The PUCCH for a single UE uses one resource block, which occupies different frequencies in each slot within a subframe. In particular, 2 resource blocks assigned to the PUCCH are frequency hopped on a slot boundary. In particular, FIG. 6 shows an example that the PUCCH satisfying conditions (e.g., m=0, 1, 2, 3) is assigned to a subframe.

The present invention intends to propose an efficient HARQ operation in case that an eNB dynamically changes a purpose of use of a specific radio resource (e.g., a DL resource or a UL resource) allocated to a UE as a DL or a UL according to a traffic load change.

First of all, prior to describing a detail explanation on the proposed scheme, an uplink-downlink configuration capable of being designated, which is defined by a 3GPP LTE system based-TDD system, is described.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

Referring to Table 1, D, U, and S assigned to each subframe number indicate a downlink subframe, an uplink subframe, and a special subframe, respectively. And, Table 2 in the following indicates an UL subframe number (index) necessary for a UE to transmit an UL ACK/NACK for a corresponding DL signal in a 3GPP LTE system-based TDD system.

TABLE 2

| UL-DL Configuration | subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 7 | — | — | — | 9 | 2 | — | — | — |
| 1 | 7 | 7 | — | — | 8 | 2 | 2 | — | — | 3 |
| 2 | 7 | 7 | — | 7 | 2 | 2 | 2 | — | 2 | 7 |
| 3 | 4 | 2 | — | — | — | 2 | 2 | 3 | 3 | 4 |
| 4 | 2 | 2 | — | — | 2 | 2 | 3 | 3 | 3 | 3 |
| 5 | 2 | 2 | — | 2 | 2 | 2 | 2 | 2 | 2 | 2 |
| 6 | 7 | 8 | — | — | — | 2 | 3 | — | — | 4 |

In particular, referring to Table 2, '-' indicates that a subframe is configured as an UL subframe. And, a number assigned to each of the subframe numbers indicates an UL subframe index. In particular, the number assigned to each of the subframe numbers indicates an index of a UL subframe interlocked with a corresponding DL subframe.

Table 2 can be represented as Table 3. The Table 3 in the following indicates that a UL ACK/NACK transmitted from a subframe n is transmitted for which subframe. In particular, an ACK/NACK for a DL signal received in a subframe n-K is fed back in the subframe n. The following Table 3 indicates a value of the K.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Recently, a concept of E-PDCCH (enhanced-PDCCH) has been proposed to reduce PDCCH performance drop caused by inter-cell interference or to resolve a lack of resources necessary for PDCCH.

Figure 7:
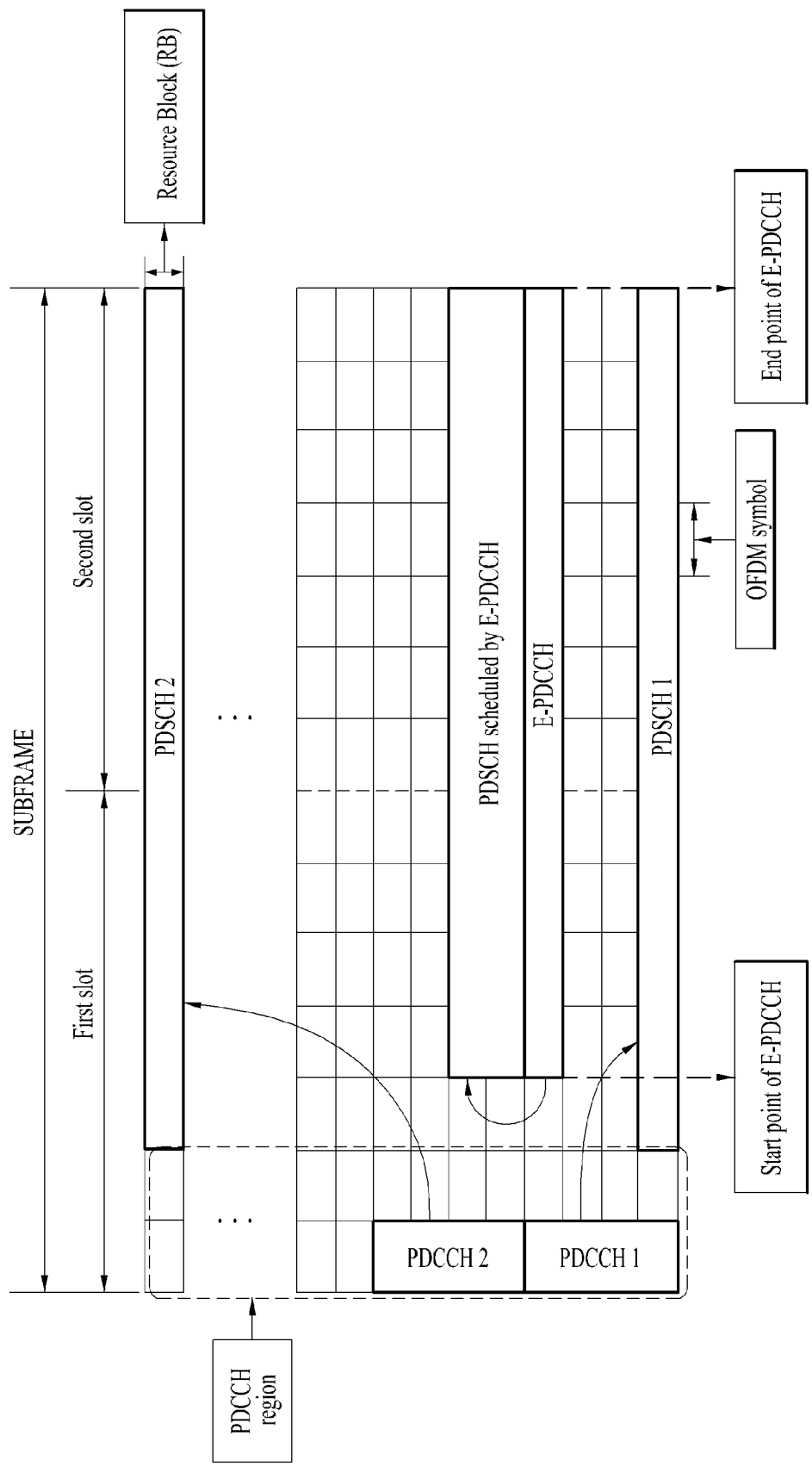
FIG. 7 is a diagram for explaining a concept of E-PDCCH (Enhanced-PDCCH)

FIG. 7 is a diagram for explaining a concept of E-PDCCH (Enhanced-PDCCH). In particular, FIG. 7 depicts a legacy PDCCH, PDSCH assigned by the PDCCH, E-PDCCH, and PDSCH region scheduled by the E-PDCCH in a manner of comparing with each other.

A length of frequency and time domain of E-PDCCH can be differently configured. In particular, an eNB can inform a UE of the length of time domain of E-PDCCH, in other word, information on a start symbol and an end symbol via an upper layer signaling, a physical control channel (e.g., a specific field of PDCCH), or a physical data channel. For instance, FIG. 7 indicates a case that the start symbol of E-PDCCH is configured with a fourth symbol of a first slot and the end symbol of E-PDCCH is configured with a last symbol of a second slot. Although it is not depicted in FIG. 7, E-PDCCH transmission can be ended on a symbol (e.g., a last symbol of a first slot) situating at a middle of a subframe.

In case of using E-PDCCH capable of transmitting by using a preconfigured part of a system band not a whole system band and a part of OFDM symbol only, the present invention proposes a method of efficiently transmitting an UL ACK/NACK for PDSCH (assigned by E-PDCCH) according to a mapping position of E-PDCCH.

More specifically, in case of using E-PDCCH in a TDD system, an UL ACK/NACK timing for PDSCH scheduled by E-PDCCH may have a case that a legacy UL ACK/NACK timing cannot be used as it is depending on a position of an end symbol of E-PDCCH due to 1) time required to decode E-PDCCH and PDSCH scheduled by E-PDCCH (or additionally UL ACK/NACK generation time) and 2) limitation on a subframe capable of being used as a UL subframe under a specific UL/DL configuration (or limitation on a UL subframe capable of being used as a UL ACK/NACK transmission). And, the aforementioned problem identically occurs in case of using E-PDCCH in a FDD system as well.

Hence, the present invention proposes a method of operating a UL ACK/NACK for PDSCH scheduled by E-PDCCH with a legacy UL ACK/NACK timing or a modified UL ACK/NACK timing according to a position of an end symbol of E-PDCCH. The present invention explains the method in a manner of dividing the FDD system from the TDD system.

<FDD System>

1. First of all, if a configuration for an end symbol of E-PDCCH sufficiently vouches for time (or additionally UL ACK/NACK generation time) required to decode E-PDCCH and PDSCH scheduled by E-PDCCH in a FDD system, a UL ACK/NACK for PDSCH scheduled by E-PDCCH follows a legacy UL ACK/NACK timing.

For instance, if the end symbol of E-PDCCH is designated to a position previous of a specific symbol including (or not including) '$a^{th}$ symbol (in a subframe)' in the FDD system, a UE transmits the UL ACK/NACK for PDSCH scheduled by E-PDCCH of a DL subframe # m in a UL subframe # (m+T). In this case, 'T' indicates the legacy UL ACK/NACK timing. As an example, 'T' can be configured as 4 in the FDD system.

As a further detail example, in case of operating as a normal CP, if the end symbol of E-PDCCH is designated to a position previous of a specific symbol including 'seventh symbol of a first slot (or sixth symbol of the first slot in case of an extended CP)', the UE transmits the UL ACK/NACK for PDSCH scheduled by E-PDCCH of a DL subframe # w in a UL subframe # (w+4) (i.e., T=4).

2. If a configuration for an end symbol of E-PDCCH cannot sufficiently vouch for time (or additionally UL ACK/NACK generation time) required to decode E-PDCCH and PDSCH scheduled by E-PDCCH in a FDD system, a UL ACK/NACK for PDSCH scheduled by E-PDCCH follows a modified UL ACK/NACK timing.

For instance, if the end symbol of E-PDCCH is designated to a position after a specific symbol including (or not including) '$a^{th}$ symbol (in a subframe)' in the FDD system, a UE transmits the UL ACK/NACK for PDSCH scheduled by E-PDCCH of a DL subframe # m in a UL subframe # (m+T*). In this case, 'T*' indicates the modified UL ACK/NACK timing. As an example, 'T*' can be configured as 5 in the FDD system.

As a further detail example, in case of operating as a normal CP, if the end symbol of E-PDCCH is designated to a position after a specific symbol not including 'seventh symbol of a first slot (or sixth symbol of the first slot in case of an extended CP)', the UE transmits the UL ACK/NACK for PDSCH scheduled by E-PDCCH of a DL subframe # p in a UL subframe # (p+4) (i.e., T*=5).

<TDD System>

(A) First of all, if a configuration for an end symbol of E-PDCCH sufficiently vouches for time (or additionally UL ACK/NACK generation time) required to decode E-PDCCH and PDSCH scheduled by E-PDCCH in a TDD system, a UL ACK/NACK for PDSCH scheduled by E-PDCCH follows a legacy UL ACK/NACK timing, i.e., the Table 2 or Table 3.

For instance, if the end symbol of E-PDCCH is designated to a position of a previous specific symbol including (or not including) '$a^{th}$ symbol (in a subframe)' in the TDD system, a UE transmits the UL ACK/NACK for PDSCH scheduled by E-PDCCH of a DL subframe # m according to the legacy UL ACK/NACK timing (Table 2 or Table 3).

As a further detail example, in case of operating as a normal CP, if the end symbol of E-PDCCH is designated to a position previous of a specific symbol including 'seventh symbol of a first slot (or sixth symbol of the first slot in case of an extended CP)', the UE transmits the UL ACK/NACK for PDSCH scheduled by E-PDCCH of a DL subframe # w according to the legacy UL ACK/NACK timing defined in the Table 2 or Table 3.

(B) If a configuration for an end symbol of E-PDCCH cannot sufficiently vouch for time (or additionally UL ACK/NACK generation time) required to decode E-PDCCH and PDSCH scheduled by E-PDCCH in a TDD system, a UL ACK/NACK for PDSCH scheduled by E-PDCCH follows a modified UL ACK/NACK timing.

i) For instance, if the end symbol of E-PDCCH is designated to a position after a specific symbol not including (or including) '$a^{th}$ symbol (in a subframe)' in the TDD system, a UE transmits the UL ACK/NACK for PDSCH scheduled by E-PDCCH of a DL subframe # m according to a modified UL ACK/NACK timing.

As a further detail example, in case of operating as a normal CP, if the end symbol of E-PDCCH is designated to a position after a specific symbol not including 'seventh symbol of a first slot (or sixth symbol of the first slot in case of an extended CP)', the UE transmits the UL ACK/NACK for PDSCH scheduled by E-PDCCH of a DL subframe # p according to the modified UL ACK/NACK timing.

As a different method capable of being applied in case of operating on the basis of the modified UL ACK/NACK timing, if a UL ACK/NACK transmission for PDSCH scheduled by (E-) PDCCH of a DL subframe # m is defined by such a specific UL subframe as a UL subframe # (m+c) (c is an integer greater than 4) under the legacy UL ACK/NACK timing shown in Table 2 or Table 3, since it is able to judge that there is sufficient time (in particular, the time required to decode E-PDCCH and PDSCH scheduled by E-PDCCH, the time required to generate the UL ACK/NACK)) to transmit the corresponding UL ACK/NACK although E-PDCCH transmission finishes late, a UE can transmit the UL ACK/NACK for PDSCH scheduled by (E-) PDCCH of the aforementioned DL subframe # m not by the modified UL ACK/NACK timing but by the legacy UL ACK/NACK timing.

Under the legacy UL ACK/NACK timing shown in Table 2 or Table 3, if a UL ACK/NACK transmission for PDSCH scheduled by (E-) PDCCH of a DL subframe # m is defined by such a specific UL subframe as a UL subframe # (m+c) (c is an integer greater than 4), it is able to judge that there is sufficient time (in particular, the time required to decode E-PDCCH and PDSCH scheduled by E-PDCCH, the time required to generate the UL ACK/NACK)) to transmit the corresponding UL ACK/NACK although E-PDCCH transmission finishes late. Hence, a UE may transmit the UL ACK/NACK for PDSCH scheduled by E-PDCCH of the aforementioned DL subframe # m not by the modified UL ACK/NACK timing but by the legacy UL ACK/NACK timing. Table 4 in the following is an example to which the aforementioned scheme is applied.

A UL ACK/NACK for a DL signal received in a DL subframe n-K is fed back in a UL subframe n and Table 4 in the following indicates a value of the K.

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, (7) | — | — | — | — | 6, (7) | — | — |
| 1 | — | — | 7, 6, (8) | — | — | — | — | 7, 6, (8) | — | — |
| 2 | — | — | 8, 7, 6, (9) | — | — | — | — | 8, 7, 6, (9) | — | — |
| 3 | — | — | 7, 6, 11, (12) | 6, 5 | 5 | — | — | — | — | — |
| 4 | — | — | 12, 8, 7, 11, (13) | 6, 5, 7 | — | — | — | — | — | — |
| 5 | — | — | 13, 12, 9, 8, 7, 5, 11, 6, (14) | — | — | — | — | — | — | — |
| 6 | — | — | 7 | 7 | 5 | — | — | 7 | 7 | — |

Referring to the modified UL ACK/NACK timing in Table 4, it an end symbol of E-PDCCH cannot sufficiently vouch for time (or additionally UL ACK/NACK generation time) required to decode E-PDCCH and PDSCH scheduled by E-PDCCH, a UE is configured to transmit a UL ACK/NACK via a nearest UL subframe appearing after a transmission timing point of the UL ACK/NACK, which is interlocked with a DL subframe # m defined by the legacy UL ACK/NACK timing shown in Table 2 or Table 3. In this case, a part represented as (x) (x is an integer) means the UL ACK/NACK timing modified from the legacy UL ACK/NACK timing (i.e., Table 3). In this case, a case that the end symbol of E-PDCCH cannot sufficiently vouch for time (or additionally UL ACK/NACK generation time) required to decode E-PDCCH and PDSCH scheduled by E-PDCCH may indicate a case that the end symbol of E-PDCCH is designated to a specific symbol position after a first slot.

And, in the modified UL ACK/NACK timing, a UL standalone subframe can be excluded in a manner of limiting subframes capable of being configured as a UL subframe to transmit a UL ACK/NACK to the UL subframes used for transmitting the UL ACK/NACK under the legacy UL ACK/NACK timing. In this case, the UL standalone subframe indicates a UL subframe where a UL ACK/NACK transmission is not performed.

Moreover, a UE can apply a method of implicitly changing a legacy UL ACK/NACK transmission scheme (e.g., a channel selection scheme, a channel multiplexing scheme, an ACK/NACK bundling scheme, a PUCCH format 3, and the like) informed by an eNB via an upper layer signaling according to a change of the number of DL subframe interlocked with a UL subframe. In this case, as an embodiment, the UE can make a rule to follow the legacy UL ACK/NACK transmission scheme within a range of maximum numbers of the DL subframe interlocked with the UL subframe supportable by the legacy UL ACK/NACK transmission scheme. And, as an embodiment, when a rule of the UL ACK/NACK transmission scheme, which will be used by the UE, is changed, the eNB and the UE can share various rules in advance. And then, the eNB can inform the UE of an indicator for activating a specific rule via the upper layer signaling or a physical layer channel (e.g., a specific field of PDCCH).

As a different embodiment, the UE can configure a rule to change the UL ACK/NACK transmission scheme only to a fixed specific one UL ACK/NACK transmission scheme informed by the eNB via the upper layer signaling or the physical layer channel in advance. As an example, if the PUCCH format 3 is configured as the fixed specific one UL ACK/NACK transmission scheme, the eNB may inform the UE of a position of a UL ACK/NACK resource in advance via the upper layer signaling.

ii) Meanwhile, in determining the modified UL ACK/NACK timing, it is able to configure the number of DL subframe, which is interlocked with a legacy UL ACK/NACK timing based-specific UL subframe, to maintain the number of DL subframe without any change.

Under the legacy UL ACK/NACK timing shown in Table 2 and Table 3, if the UL ACK/NACK transmission for PDSCH scheduled by E-PDCCH of the DL subframe # m is defined by such a specific UL subframe as a UL subframe # (m+c) (c is an integer greater than 4), it is able to judge that there is sufficient time (in particular, time required to decode E-PDCCH and PDSCH scheduled by E-PDCCH, time required to generate the UL ACK/NACK) to transmit the corresponding UL ACK/NACK although E-PDCCH transmission finishes late. Hence, the UE can transmit the UL ACK/NACK for PDSCH scheduled by E-PDCCH of the aforementioned DL subframe # m not by the modified UL ACK/NACK timing but by the legacy UL ACK/NACK timing. Table 5 in the following is an example to which the aforementioned scheme is applied.

TABLE 5

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | (9) | — | — | 6 | — | (9) |
| 1 | — | — | 7, 6 | (9) | — | — | — | 7, 6 | (9) | — |
| 2 | — | — | 8, 7, 6, (9) | — | — | — | — | 8, 7, 6, (9) | — | — |
| 3 | — | — | 7, 6, 11 | 6, 5 | 5, (14) | — | — | — | — | — |
| 4 | — | — | 12, 8, 7, 11 | 6, 5, 7, (14) | — | — | — | — | — | — |
| 5 | — | — | 13, 12, 9, 8, 7, 5, 11, 6, (14) | — | — | — | — | — | — | — |
| 6 | — | — | 7 | 7 | 5 | — | — | 7 | 7 | — |

And, in the modified UL ACK/NACK timing, a UL standalone subframe may be excluded in a manner of limiting subframes capable of being configured as a UL subframe to transmit a UL ACK/NACK to the UL subframes used for transmitting the UL ACK/NACK under the legacy UL ACK/NACK timing.

The aforementioned scheme has a merit in that the UL ACK/NACK transmission scheme (e.g., a channel selection scheme, a channel multiplexing scheme, an ACK/NACK bundling scheme) used in case of following the legacy UL ACK/NACK timing can be applied as it is in case that the modified UL ACK/NACK timing is used as well. A part represented as (x) (x is an integer) in the Table 5 means the modified UL ACK/NACK timing in the legacy UL ACK/NACK timing.

iii) As a modified form of the Table 5, it is able to make a rule to transmit the UL ACK/NACK in a legacy UL standalone subframe as well. For instance, according to a UL/DL configuration 0 of the Table 5, the UL ACK/NACK transmitted in a UL subframe #4 and a UL subframe #9 can be transmitted in a UL subframe #0 and a UL subframe #5, respectively in a manner of making a rule. Yet, in this case, it is able to configure the modified UL ACK/NACK timing not to exceed the maximum number of DL subframes interlocked with the UL subframes under a specific UL/DL configuration. As a different scheme, it is able to configure the modified UL ACK/NACK timing not to exceed the minimum number of DL subframes interlocked with the UL subframes.

iv) In addition, it is able to differently or identically configure the UL ACK/NACK timing for PDSCH assigned by a legacy PDCCH and the UL ACK/NACK timing for PDSCH scheduled by E-PDCCH.

For instance, in case of differently configuring the UL ACK/NACK timing for PDSCH assigned by a legacy PDCCH and the UL ACK/NACK timing for PDSCH scheduled by E-PDCCH, the UL ACK/NACK timing for PDSCH assigned by the PDCCH is configured to follow the legacy UL ACK/NACK timing (i.e., Table 3) and the UL ACK/NACK timing for PDSCH scheduled by E-PDCCH can be configured to operate according to the legacy UL ACK/NACK timing or the modified UL ACK/NACK timing in accordance with the configuration of the end symbol of E-PDCCH.

And, in case of identically configuring the UL ACK/NACK timing for PDSCH assigned by the legacy PDCCH and the UL ACK/NACK timing for PDSCH scheduled by E-PDCCH, the UL ACK/NACK timing for PDSCH assigned by the PDCCH and the UL ACK/NACK timing for PDSCH scheduled by E-PDCCH can be configured to operate according to either the legacy UL ACK/NACK timing or the modified UL ACK/NACK timing in accordance with the configuration of the end symbol of E-PDCCH.

The aforementioned proposed schemes can be extensively applied to all cases including a case of performing an E-PDCCH-based DL/UL control information transmission or performing a DL/UL data transmission. And, the proposed schemes can be extensively applied to a situation where a resource configuration rule for E-PDCCH is configured with a FDM scheme (e.g., in case of using a frequency domain resource of a preconfigured unit to transmit E-PDCCH), a TDM scheme (e.g., in case of using a time domain resource of a preconfigured unit to transmit E-PDCCH), or a FDM+TDM scheme (e.g., in case of using a time/frequency domain resource of a preconfigured unit to transmit E-PDCCH) as well.

Figure 8:
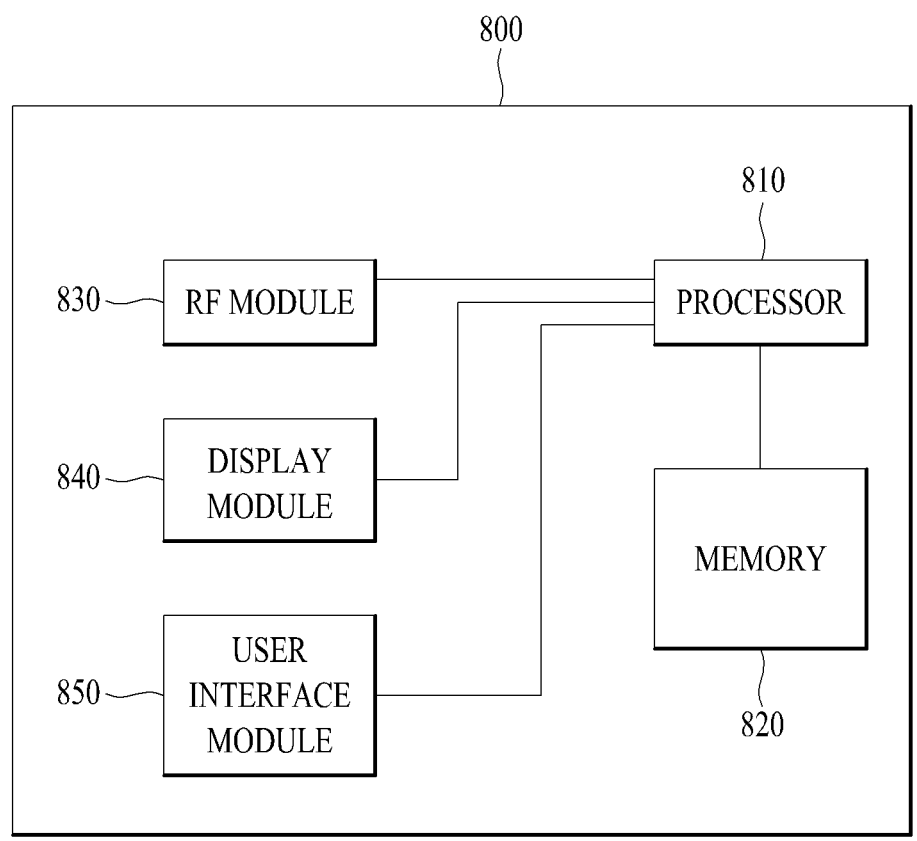
FIG. 8 is a block diagram of an example for a communication device according to one embodiment of the present invention.

FIG. 8 is a block diagram of an example for a communication device according to one embodiment of the present invention.

Referring to FIG. 8, a communication device 800 may include a processor 810, a memory 820, an RF module 830, a display module 840, and a user interface module 850.

Since the communication device 800 is depicted for clarity of description, prescribed module(s) may be omitted in part. The communication device 800 may further include necessary module(s). And, a prescribed module of the communication device 800 may be divided into subdivided modules. A processor 810 is configured to perform an operation according to the embodiments of the present invention illustrated with reference to drawings. In particular, the detailed operation of the processor 810 may refer to the former contents described with reference to FIG. 1 to FIG. 7.

The memory 820 is connected with the processor 810 and stores an operating system, applications, program codes, data, and the like. The RF module 830 is connected with the processor 810 and then performs a function of converting a baseband signal to a radio signal or a function of converting a radio signal to a baseband signal. To this end, the RF module 830 performs an analog conversion, amplification, a filtering, and a frequency up conversion, or performs processes inverse to the former processes. The display module 840 is connected with the processor 810 and displays various kinds of informations. And, the display module 840 can be implemented using such a well-known component as an LCD (liquid crystal display), an LED (light emitting diode), an OLED (organic light emitting diode) display and the like, by which the present invention may be non-limited. The user interface module 850 is connected with the processor 810 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting an ACK/NACK response, which is transmitted by a user equipment in a wireless communication system and apparatus therefor are described with reference to examples applied to 3GPP LTE system, it may be applicable to various kinds of wireless communication systems as well as to the 3GPP LTE system.

What is claimed is:
1. A method for receiving downlink signals from a base station at a user equipment in a wireless communication system, the method comprising:
configuring a starting symbol of a first physical downlink control channel in a subframe comprising a plurality of symbols based on a first parameter signaled via a higher layer;
receiving a physical control format indicator channel including a second parameter in the subframe, wherein the second parameter indicates a number of symbols for a control channel region in the subframe;
receiving at least one of the first physical downlink control channel or a second physical downlink control channel in the subframe;
receiving at least one of a first physical downlink data channel corresponding to the first physical downlink control channel or a second physical downlink data channel corresponding to the second physical downlink control channel in the subframe; and
transmitting a first physical uplink control channel corresponding to the first physical downlink data channel or a second physical uplink control channel corresponding to the second physical downlink data channel to the base station,
wherein a starting symbol of the first physical downlink data channel is the same as the starting symbol of the first physical downlink control channel configured based on the first parameter signaled via the higher layer, wherein a starting symbol of the second physical downlink data channel in the subframe is a next symbol of a last symbol for the control channel region in the subframe, wherein, if an index of an ending symbol of the first physical downlink control channel is less than or equal to a threshold value, a subframe index in which the first physical uplink control channel is transmitted is the same as a subframe index in which the second physical uplink control channel is transmitted, and wherein, if the index of the ending symbol of the first physical downlink control channel is greater than the threshold value, the subframe index in which the first physical uplink control channel is transmitted is greater than the subframe index in which the second physical uplink control channel is transmitted.

2. The method of claim 1, wherein the first physical downlink control channel includes scheduling information for the first physical downlink data channel and the second physical downlink control channel includes scheduling information for the second physical downlink data channel.

3. The method of claim 1, wherein the first physical downlink control channel is an EPDCCH (Enhanced Physical Downlink Control Channel) and the second physical downlink control channel is a PDCCH (Physical Downlink Control Channel).

4. The method of claim 1, wherein the ending symbol of the first physical downlink control channel and the first physical downlink data channel in the subframe is determined based on the first parameter.

5. A user equipment in a wireless communication system, the user equipment comprising:
   a radio frequency (RF) unit; and
   a processor connected with the RF unit and configured to:
      receive information about a starting symbol of a first physical downlink control channel in a subframe comprising a plurality of symbols based on a first parameter signaled via a higher layer,
      receive a physical control format indicator channel including a second parameter in the subframe, to receive at least one of the first physical downlink control channel or a second physical downlink control channel in the subframe,
      receive at least one of a first physical downlink data channel corresponding to the first physical downlink control channel or a second physical downlink data channel corresponding to the second physical downlink control channel in the subframe, and
      transmit a first physical uplink control channel corresponding to the first physical downlink data channel or a second physical uplink control channel corresponding to the second physical downlink data channel, wherein the second parameter indicates a number of symbols for a control channel region in the subframe, wherein a starting symbol of the first physical downlink data channel is the same as the starting symbol of the first physical downlink control channel configured based on the first parameter signaled via the higher layer, wherein a starting symbol of the second physical downlink data channel in the subframe is a next symbol of a last symbol for the control channel region in the subframe, wherein, if an index of an ending symbol of the first physical downlink control channel is less than or equal to a threshold value, a subframe index in which the first physical uplink control channel is transmitted is the same as a subframe index in which the second physical uplink control channel is transmitted, and wherein, if the index of the ending symbol of the first physical downlink control channel is greater than the threshold value, the subframe index in which the first physical uplink control channel is transmitted is greater than the subframe index in which the second physical uplink control channel is transmitted.

6. The user equipment of claim 5, wherein the first physical downlink control channel includes scheduling information for the first physical downlink data channel and the second physical downlink control channel includes scheduling information for the second physical downlink data channel.

7. The user equipment of claim 5, wherein the first physical downlink control channel is an EPDCCH (Enhanced Physical Downlink Control Channel) and the second physical downlink control channel is a PDCCH (Physical Downlink Control Channel).

8. The user equipment of claim 5, wherein the ending symbol of the first physical downlink control channel and the first physical downlink data channel in the subframe is determined based on the first parameter.

* * * * *